United States Patent
Saner

(10) Patent No.: US 9,753,956 B2
(45) Date of Patent: *Sep. 5, 2017

(54) CLEANER WITH COMPUTER MONITORING

(71) Applicant: Piriform Ltd., Nicosia (CY)

(72) Inventor: Guy Saner, St. James (BB)

(73) Assignee: PIRIFORM LTD., Nicosia (CY)

( * ) Notice: Subject to any disclaimer, the term of this patent is extended or adjusted under 35 U.S.C. 154(b) by 0 days.

This patent is subject to a terminal disclaimer.

(21) Appl. No.: 15/019,914

(22) Filed: Feb. 9, 2016

(65) Prior Publication Data
US 2016/0299922 A1    Oct. 13, 2016

Related U.S. Application Data

(63) Continuation of application No. 13/869,558, filed on Apr. 24, 2013, now Pat. No. 9,256,625.

(51) Int. Cl.
*G06F 17/30* (2006.01)

(52) U.S. Cl.
CPC .. *G06F 17/30303* (2013.01); *G06F 17/30905* (2013.01)

(58) Field of Classification Search
None
See application file for complete search history.

(56) References Cited

U.S. PATENT DOCUMENTS

| 6,405,362 | B1 | 6/2002 | Shih et al. | |
| 7,069,324 | B1* | 6/2006 | Tiwana | G06F 12/0806 709/215 |
| 2002/0178232 | A1* | 11/2002 | Ferguson | G06Q 30/0251 709/217 |
| 2011/0270892 | A1 | 11/2011 | Chou et al. | |

OTHER PUBLICATIONS

Final Office Action dated Jun. 2, 2016 for related U.S. Appl. No. 13/853,772.
Non-Final Office Action dated Feb. 23, 2017 for related U.S. Appl. No. 13/853,772.
Non-Final Office Action dated Mar. 22, 2017 for related U.S. Appl. No. 15/040,711.

* cited by examiner

*Primary Examiner* — Syed Hasan
(74) *Attorney, Agent, or Firm* — Miles & Stockbridge PC

(57) ABSTRACT

A cleaning application that can monitor one or more characteristics of a computer, and that can clean at least one of one or more files or a registry of the computer, is provided. The cleaning application can include a cleaning module. The cleaning module can monitor one or more characteristics of the computer. The cleaning module can further detect an occurrence of pre-defined criteria involving the one or more characteristics. The cleaning module can further perform a pre-defined action in response to the pre-defined criteria. The pre-defined action can include cleaning at least one of one or more files or a registry associated with the computer.

27 Claims, 6 Drawing Sheets

CLEANER WITH COMPUTER MONITORING

BACKGROUND

Field

Certain embodiments of the invention relate generally to computer systems, and, more particularly, to registry and file cleaning computer systems.

Description of the Related Art

A computer contains one or more computer files (i.e., files), where a file is a resource that stores data that can be accessed by a computer program that is executed within the computer. A computer also contains a registry, where a registry is a hierarchical database that is stored on the computer and stores configuration settings and options for the computer.

During the lifetime of a computer, thousands of files can end up being stored on the computer. Many of these files may never be used by any software modules that are executed within the computer. Thus, these files are unused files that merely take up storage space of the computer, and potentially slow down the processing speed of the computer. A file cleaning software module, when executed on the computer, can identify unused files and delete them from the computer.

Similarly, during the lifetime of the computer, a registry can become bloated with numerous configuration entries. In certain cases, many of the entries are not used by any computer program. For example, when a new version of a computer program is installed on the computer, the registry may be updated to contain a new entry corresponding to the new version. However, the old entry corresponding to the older version may not be deleted. Thus, a large number of entries in the registry may be superfluous. Similar to a file cleaning software module, a registry cleaning software module, when executed on the computer, can identify unused entries in a registry, and delete them from the registry.

SUMMARY

According to an embodiment of the invention, a method includes monitoring, by a cleaning module executed on a computer, one or more characteristics of the computer. The method further includes detecting, by the cleaning module, an occurrence of pre-defined criteria involving the one or more characteristics of the computer. The method further includes performing, by the cleaning module, a pre-defined action on the computer.

According to another embodiment, an apparatus includes a memory configured to store a cleaning module. The apparatus further includes a processor configured to execute the cleaning module stored on the memory. The processor is further configured, when executing the cleaning module stored on the memory, to, monitor one or more characteristics of a computer, detect an occurrence of pre-defined criteria involving the one or more characteristics of the computer, and perform a pre-defined action on the computer.

According to another embodiment, a non-transitory computer-readable medium includes a computer program stored thereon that, when executed by a processor, causes the processor to implement a method. The method includes monitoring one or more characteristics of a computer. The method further includes detecting an occurrence of pre-defined criteria involving the one or more characteristics of the computer. The method further includes performing a pre-defined action on the computer.

According to another embodiment, an apparatus includes means for monitoring one or more characteristics of a computer. The apparatus further includes means for detecting an occurrence of pre-defined criteria involving the one or more characteristics of the computer. The apparatus further includes means for performing a pre-defined action on the computer.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein.

DETAILED DESCRIPTION

Figure 1:
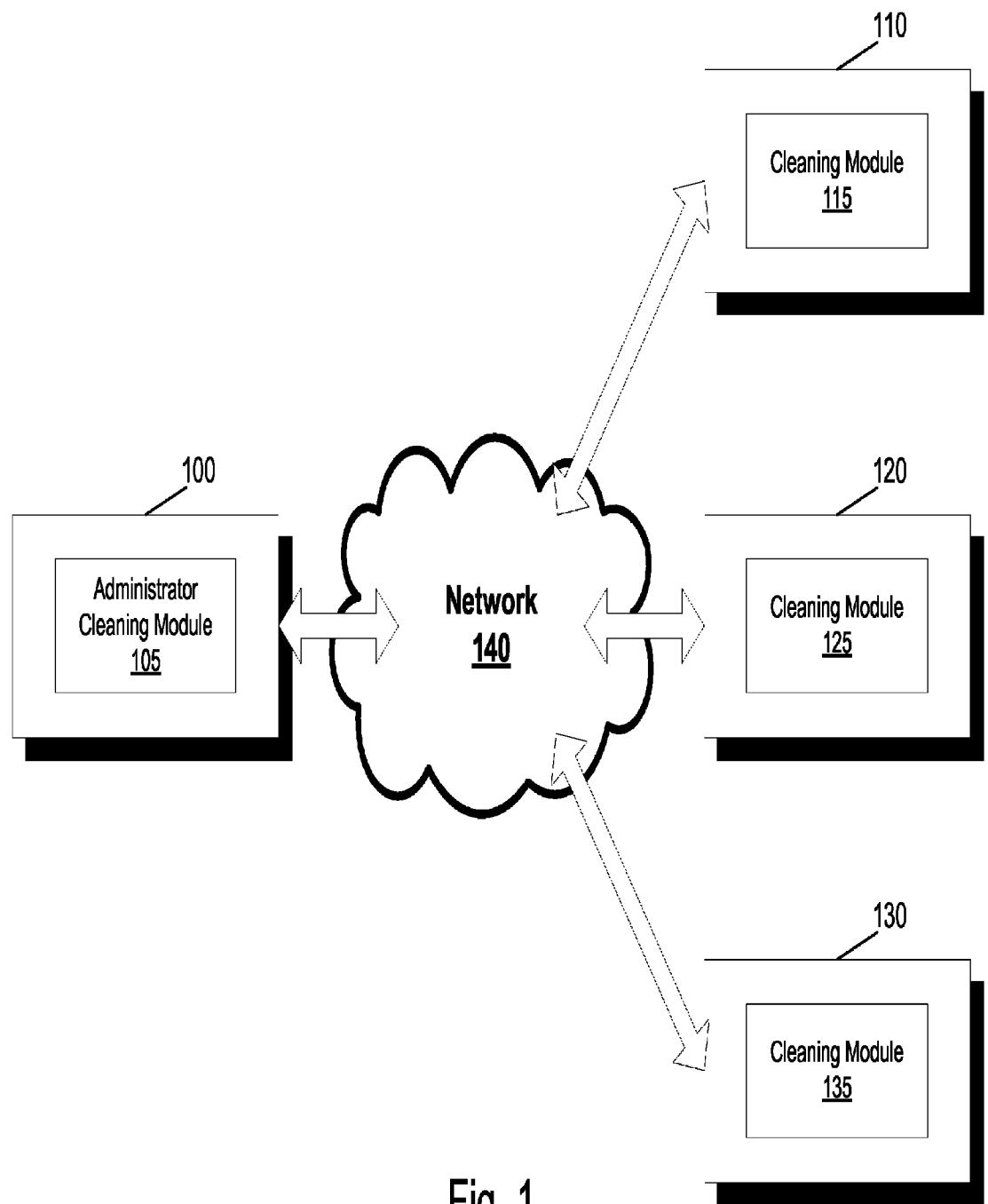
FIG. 1 illustrates a block diagram of a system, according to an embodiment of the invention.

It will be readily understood that the components of the present invention, as generally described and illustrated in the figures herein, may be arranged and designed in a wide variety of different configurations. Thus, the following detailed description of the embodiments of a method, apparatus, system, and computer-readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "an embodiment," "one embodiment," "another embodiment," "an alternative embodiment," "an alternate embodiment," "certain embodiments," "some embodiments," "different embodiments" or other similar language, throughout this specification refers to the fact that a particular feature, structure, or characteristic described in connection with the embodiment may be included in at least one embodiment of the present invention. Thus, appearances of the phrases "an embodiment," "one embodiment," "another embodiment," "an alternative embodiment," "an alternate embodiment," "in certain embodiments," "in some embodiments," "in other embodiments," "in different embodiments," or other similar language, throughout this specification do not necessarily all refer to the same group of embodiments, and the described features, structures, or characteristics may be combined in any suitable manner in one or more embodiments.

A "computer," as understood by one of ordinary skill in the art, is any programmable machine that receives input, automatically stores and manipulates data, and provides output. A "computer program" is any sequence of instructions written to perform a specific task on a computer, and has an executable form that a computer (typically through the use of a processor) can use to execute the instructions. A "computer module," "software module," or "module" is any computer program, or a portion thereof, that encapsulates related functions. A "computer application," "software application," or "application" is any collection of computer programs and/or modules. A "computer network" or "network" is any collection of computers interconnected by communication channels that facilitate communication among the computers. A "browser application," "browser," "web browser application," "web browser," "Internet browser application," or "Internet browser" is an application configured to retrieve, present, and traverse information resources over the Internet, such as the World Wide Web. Examples of a browser application include Microsoft® Internet Explorer®, Mozilla® Firefox®, Apple® Safari®, Opera®, and Google® Chrome®.

In addition, a "service" or "web service," as understood by one of ordinary skill in the art, is a module or application designed to support interoperable computer-to-computer interaction over a network. A service can have an interface described in a computer-processable format. A computer can interact with a service by sending messages over a network protocol. Examples of services are Big Web services and RESTful services. Big Web services are services that follow a Simple Object Access Protocol (SOAP) standard and use Extensible Markup Language (XML) messages. RESTful services are services that utilize a Representational State Transfer (REST) style of software architecture, where clients are separate from servers by a uniform interface.

According to an embodiment of the invention, a cleaning application can monitor one or more characteristics of a computer, such as a size of file storage space saved by cleaning one or more files. The cleaning application can further detect an occurrence of pre-defined criteria involving the one or more characteristics, such as the size of the file storage space saved by cleaning one or more files exceeding a pre-defined threshold. Upon this detection, the cleaning application can perform a pre-defined action on the computer. For example, upon detecting that the size of the file storage space saved by cleaning one or more files exceeding a pre-defined threshold, the cleaning application can clean at least one of one or more files of the computer or a registry of the computer. Specifics of the file cleaning and registry cleaning are described below in greater detail. The cleaning application can include a cleaning module and can optionally also include an administrative cleaning module.

FIG. 1 illustrates a block diagram of a system, according to an embodiment of the invention. The system can include computers 100, 110, 120, and 130. Computers 100, 110, 120, and 130 can each be any type of computer known in the art, such as a microcomputer, a personal computer, a desktop computer, a laptop computer, a notebook computer, a Palmtop computer, a server, a tablet computer, a smartphone, a smartbook, a personal digital assistant (PDA), a minicomputer, a mainframe computer, a supercomputer, a workstation, or an embedded computer. One of ordinary skill in the art would readily appreciate that the number of computers illustrated in FIG. 1 is merely an example number according to the embodiment, and that, in alternate embodiments, the system can include any number of computers.

The system can also include network 140. Network 140 can be any type of network that is known in the art, such as a local area network (LAN), a wide area network (WAN), a personal area network (PAN), a home area network (HAN), a campus area network (CAN), a metropolitan area network (MAN), a global area network (GAN), a storage area network (SAN), a virtual private network (VPN), a wireless network, a wireless LAN, a HomePNA, a power line communication network, a G.hn network, a Bluetooth network, an optical fiber network, an Ethernet network, an active networking network, a client-server network, a peer-to-peer network, a bus network, a star network, a ring network, a mesh network, a star-bus network, a tree network, or a hierarchical topology network. According to the embodiment, computer 100 can establish a connection with any of computers 110, 120, and 130 over network 140 using a network protocol. The network protocol can be any communication protocol that is known in the art, such as an Internet Protocol (IP), a Transmission Control Protocol (TCP), a User Datagram Protocol (UDP), an Internet Control Message Protocol (ICMP), a Hypertext Transfer Protocol (HTTP), a Post Office Protocol (POP), a File Transfer Protocol (FTP), or an Internet Message Access Protocol (IMAP). According to an embodiment, the network protocol can be a secured network protocol, and the connection between computer 100 and any of computers 110, 120, and 130 can be a secured connection. In the embodiment illustrated in FIG. 1, computer 100 can establish a connection with the three computers in the system, i.e., computers 110, 120, and 130, over network 140. However, this is merely an example, and in alternate embodiments, a computer can establish a connection with any number of computers over a network. Further, in alternate embodiments, network 140 can be omitted, and computers 100, 110, 120, and 130 can be separate and unconnected to each other.

According to the embodiment, computer 100 can include administrator cleaning module 105. Administrator cleaning module 105 is a module that is executed by computer 100. Administrator cleaning module 105 can remotely deploy one or more cleaning modules (such as cleaning modules 115, 125, and 135) to computers 110, 120, and 130 over network 140. Administrator cleaning module 105 can also remotely manage file and registry cleaning performed by the deployed one or more cleaning modules. In certain embodiments, the system does not include administrator cleaning module 105.

Also according to the embodiment, computer 110 can include cleaning module 115, computer 120 can include cleaning module 125, and computer 130 can include cleaning module 135. Cleaning modules 115, 125, and 135 are each modules that are executed by computers 110, 120, and 130, respectively. Cleaning modules 115, 125, and 135 can each perform file and registry cleaning on computers 110, 120, and 130, respectively. More specifically, cleaning modules 115, 125, and 135 can each monitor one or more characteristics of their respective computer (such as a size of file storage space saved by cleaning one or more files), and perform a pre-defined action in response to a detection of an occurrence of pre-defined criteria involving the one or more characteristics, where the pre-defined action can include cleaning one or more files and/or a registry of the respective computer, and where the pre-defined criteria can include the size of the file storage space saved by cleaning one or more files exceeding a pre-defined threshold. In certain embodiments, the file and registry cleaning can be managed by administrator cleaning module 105. However, in embodiments where administrator cleaning module 105 is omitted from the system, cleaning modules 115, 125, and 135 can manage their own respective file and registry cleaning. The functionality of cleaning modules 115, 125, and 135 is described below in greater detail in relation to FIG. 2.

Figure 2:
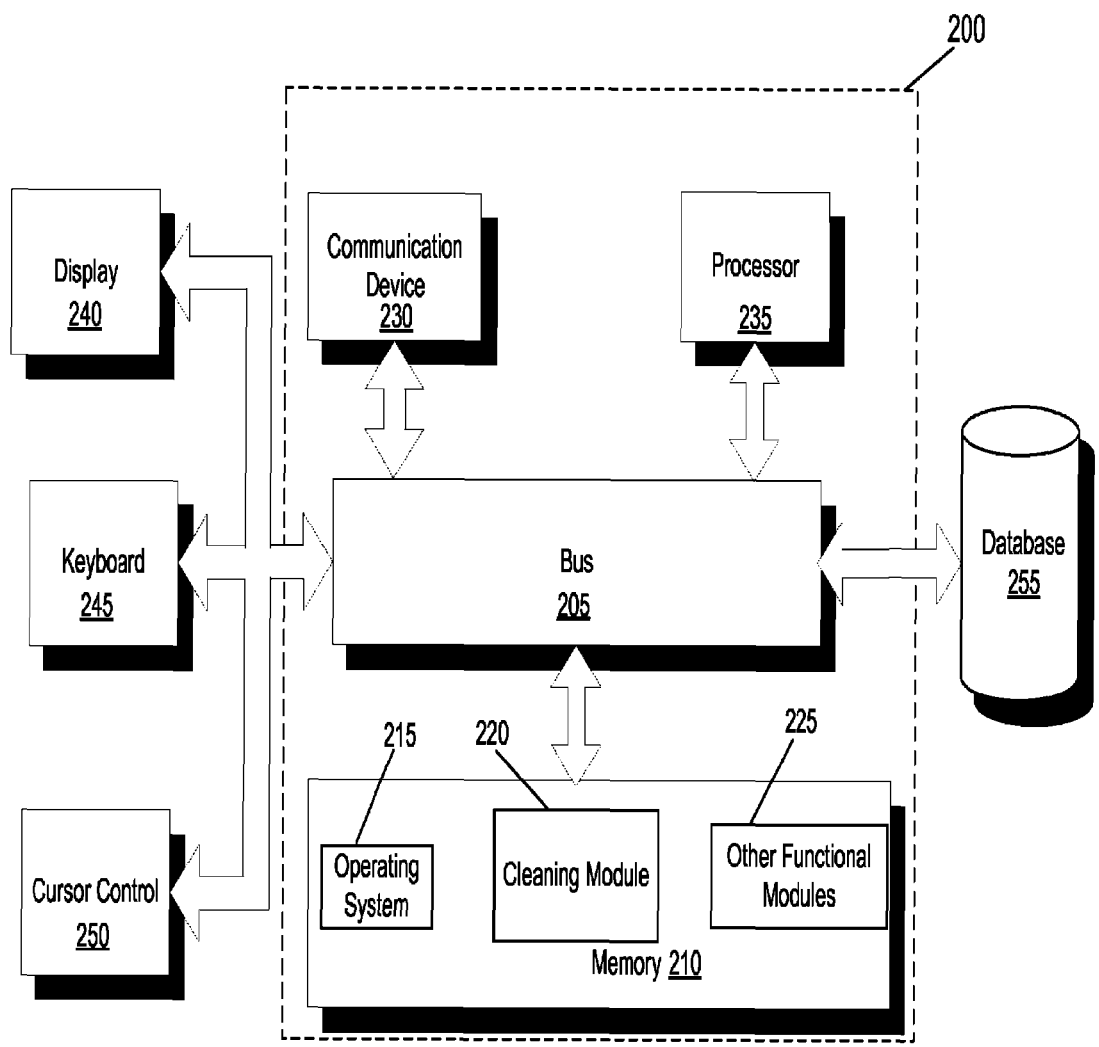
FIG. 2 illustrates a block diagram of an apparatus that implements a cleaning module, according to an embodiment of the invention.

FIG. 2 illustrates a block diagram of an apparatus 200 that implements a cleaning module 220, according to an embodiment of the invention. In one embodiment of the invention, apparatus 200 is a computer similar to computers 110, 120, and 130 of FIG. 1. Apparatus 200 includes a bus 205 or other communication mechanism for communicating information between components of apparatus 200. Apparatus 200 also includes a processor 235, operatively coupled to bus 205, for processing information and executing instructions or operations. Processor 235 may be any type of general or specific purpose processor. Apparatus 200 further includes a memory 210 for storing information and instructions to be executed by processor 235. Memory 210 can be comprised of any combination of random access memory (RAM), read only memory (ROM), static storage such as a magnetic or optical disk, or any other type of machine or computer-readable medium. Apparatus 200 further includes a communication device 230, such as a network interface card or other communication interface, to provide access to a network. As a result, a user may interface with apparatus 200 directly, or remotely through a network or any other method. In addition, apparatus 200 may interface with any other computers or devices through a network.

A computer-readable medium may be any available medium that can be accessed by processor 235. A computer-readable medium may include both a volatile and nonvolatile medium, a removable and non-removable medium, and a storage medium. A storage medium may include RAM, flash memory, ROM, erasable programmable read-only memory (EPROM), electrically erasable programmable read-only memory (EEPROM), registers, hard disk, a removable disk, a compact disc read-only memory (CD-ROM), or any other form of storage medium known in the art.

Processor 235 can also be operatively coupled via bus 205 to a display 240, such as a Liquid Crystal Display (LCD). Display 240 can display information to the user. A keyboard 245 and a cursor control device 250, such as a computer mouse, can also be operatively coupled to bus 205 to enable the user to interface with apparatus 200.

According to one embodiment, memory 210 can store software modules that may provide functionality when executed by processor 235. The modules can include cleaning module 220. Cleaning module 220 can monitor one or more characteristics of the apparatus, such as a size of file storage space saved by cleaning one or more files, and perform a pre-defined action in response to a detection of an occurrence of pre-defined criteria involving the one or more characteristics, where the pre-defined action can include cleaning one or more files and/or a registry of the apparatus, and where the pre-defined criteria can include the size of the file storage space saved by cleaning one or more files exceeding a pre-defined threshold. According to the embodiment, the modules can also include an operating system 215, as well as other functional modules 225. Operating system 215 can provide an operating system functionality for apparatus 200. Apparatus 200 can also be part of a larger system. Thus, apparatus 200 can include one or more additional functional modules 225 to include additional functionality for the system.

Processor 235 can also be operatively coupled via bus 205 to a database 255. Database 255 can store data in an integrated collection of logically-related records or files. Database 255 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 3:
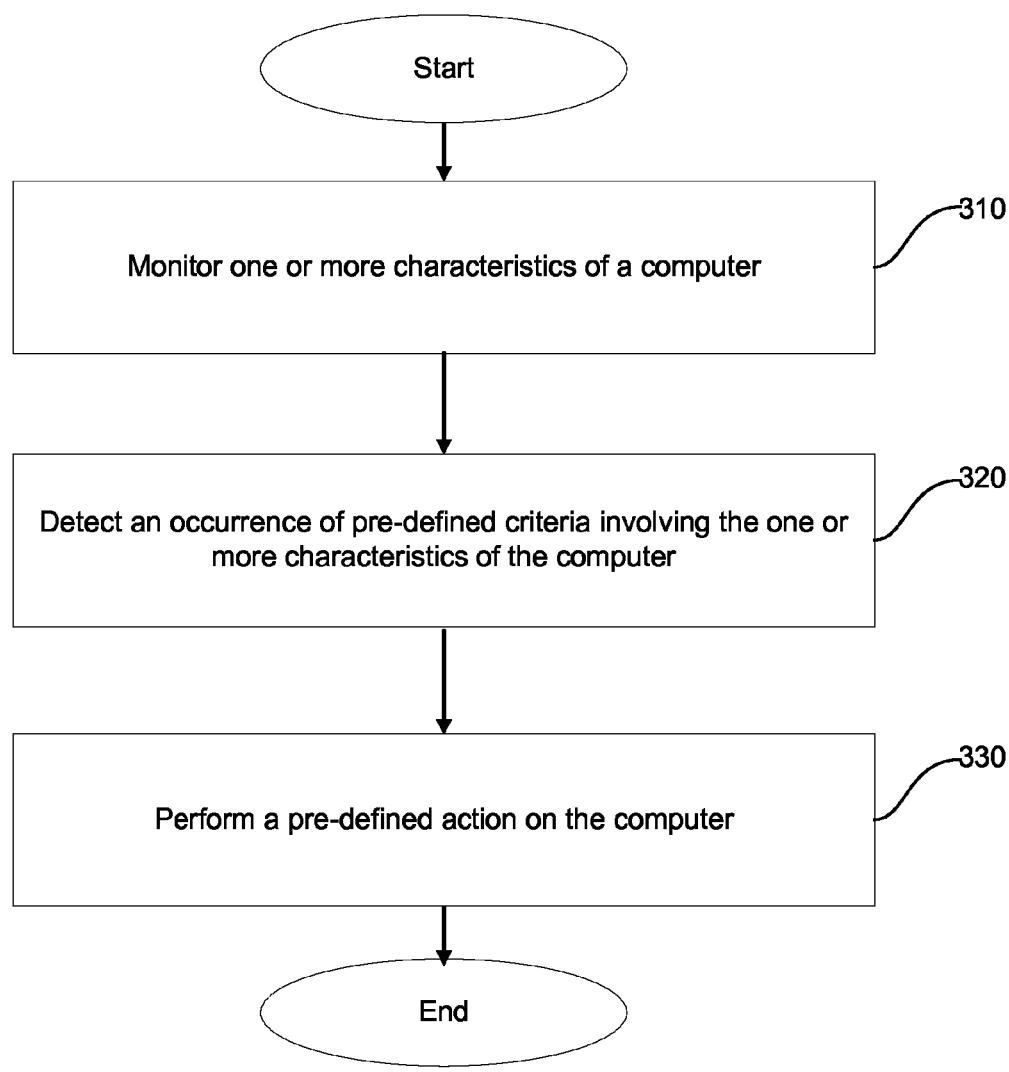
FIG. 3 illustrates a flow diagram of a method, according to an embodiment of the invention.
Figure 4:
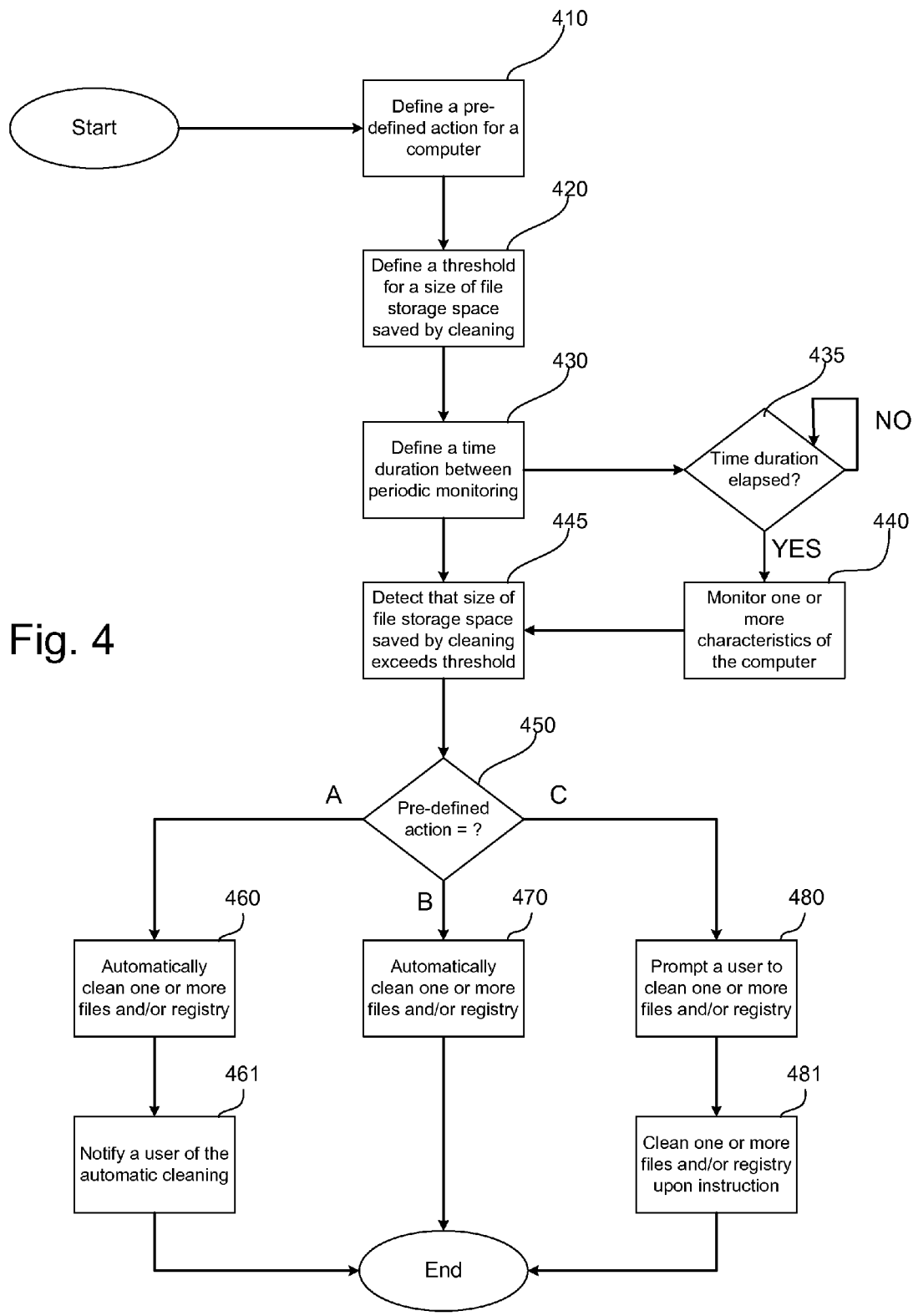
FIG. 4 illustrates a flow diagram of a method for monitoring one or more characteristics of a computer and performing a pre-defined action in response to a detection of an occurrence of pre-defined criteria involving the one or more characteristics of the computer, according to an embodiment of the invention.

FIGS. 3 and 4 each illustrate a method according to an embodiment of the invention. The steps of a method or algorithm described in connection with the embodiments disclosed herein may be embodied directly in hardware, in a computer program executed by a processor, or in a combination of the two. A computer program may be embodied on a computer-readable medium, such as a storage medium. For example, a computer program may reside in RAM, flash memory, ROM, EPROM, EEPROM, registers, hard disk, a removable disk, a CD-ROM, or any other form of storage medium known in the art. An exemplary storage medium may be coupled to the processor such that the processor can read information from, and write information to, the storage medium. In the alternative, the storage medium may be integral to the processor. The processor and the storage medium may reside in an application specific integrated circuit (ASIC). In the alternative, the processor and the storage medium may reside as discrete components. Furthermore, a computer-readable medium may be any type of tangible medium.

FIG. 3 illustrates a flow diagram of a method, according to an embodiment of the invention. In one embodiment, the method can be implemented by a cleaning module executed on a computer. As previously described, a cleaning module can monitor one or more characteristics of a computer (such as a size of file storage space saved by cleaning one or more files), and perform a pre-defined action in response to a detection of an occurrence of pre-defined criteria involving the one or more characteristics, where the pre-defined action can include cleaning one or more files and/or a registry of the computer, and where the pre-defined criteria can include the size of the file storage space saved by cleaning one or more files exceeding a pre-defined threshold.

According to the embodiment, the method begins, and at step 310, one or more characteristics of a computer are monitored. In certain embodiments, the one or more characteristics of the computer can include at least one of: a size of file storage space for one or more files, a number of uniform resource locators associated with an application; a number of settings associated with an application; a size of an individual file; a size of a trash area associated with an email account; a number of registry values of a registry; or a number of files. In certain embodiments, the monitoring of the one or more characteristics of the computer further includes analyzing the one or more characteristics of the computer. Further, in some of those embodiments, the analyzing of the one or more characteristics of the computer further includes identifying both the one or more characteristics currently present on the computer, and the one or more characteristics present if the cleaning module cleaned one or more files and/or a registry of the computer. Further, in certain embodiments, the monitoring the one or more characteristics of the computer can further include periodically monitoring the one or more characteristics based on a time duration value, where the time duration value defines a time duration between periodic instances of monitoring the computer. The method then proceeds to step 320.

At step 320, an occurrence of pre-defined criteria involving the one or more characteristics of the computer is detected. In certain embodiments, the pre-defined criteria includes, at least one of: a size of file storage space saved by cleaning one or more files exceeding a pre-defined threshold; a number of uniform resource locators associated with an application exceeding a pre-defined threshold; a number of settings associated with an application exceeding a pre-defined threshold; a size of an individual file saved by cleaning the individual file exceeding a pre-defined threshold; a size of a trash area associated with an email account exceeding a pre-defined threshold; a number of registry values of a registry exceeding a pre-defined threshold; or a number of files exceeding a pre-defined threshold. The method then proceeds to step 330.

At step 330, a pre-defined action is performed on the computer. In certain embodiments, the pre-defined action is one of: automatically cleaning at least one of one or more files or a registry of the computer, and notifying a user of the computer of the automatic cleaning; automatically cleaning at least one of one or more files or a registry of the computer; or prompting the user of the computer to clean at least one of one or more files or a registry of the computer, and cleaning at least one of one or more files or a registry of the computer in response to receiving an instruction to clean from the user of the computer. In certain embodiments, the prompting the user of the computer further includes displaying a window within a user interface, where the window prompts the user of the computer to clean at least one of one or more files or a registry of the computer.

In certain embodiments, the cleaning is based on an instruction and a cleaning rule set. In some of these embodiments, the cleaning module includes one or more cleaning rules, the cleaning rule includes one or more cleaning rule identities, each cleaning rule identity corresponds to a unique cleaning rule, and a cleaning rule includes a set of one or more parameters for cleaning at least one of one or more files or a registry of the computer. Further, in some of these embodiments, each cleaning rule identity corresponds to either a system cleaning rule, an application cleaning rule, or a registry cleaning rule. Even further, in some of these embodiments, the cleaning one or more files or a registry of the computer further includes, for each cleaning rule that corresponds to each cleaning rule identity, at least one of the following: removing one or more files from the computer; removing data from one or more files; removing one or more registry entries from the computer; or removing data from one or more registry entries, based on the cleaning rule. In certain embodiments, one or more databases of the computer can also be cleaned, where the cleaning is based on an instruction to clean one or more databases and a cleaning rule set. Further, in some of these embodiments, one or more browser applications of the computer can be optimized, where the optimizing is based on an instruction to optimize one or more browser applications and a cleaning rule set. The cleaning of the one or more files of the computer, and the cleaning of the registry of the computer, are each further described below in greater detail. After step 330, the method ends.

FIG. 4 illustrates a flow diagram of a method for monitoring one or more characteristics of a computer and performing a pre-defined action in response to a detection of an occurrence of pre-defined criteria involving the one or more characteristics of the computer, according to an embodiment of the invention. According to one embodiment, the following steps can be part of a method for cleaning one or more files and/or a registry of a computer.

In the embodiment, the flow begins, and, at step 410, a cleaning module defines a pre-defined action for a computer. According to the embodiment, the cleaning module defines the pre-defined action for the computer, so that upon a detection of an occurrence of pre-defined criteria, the pre-defined action can be performed. In certain embodiments, the pre-defined action can be defined by a user of the cleaning module, where the user selects an action from a list of actions displayed within a user interface of the cleaning module. An example of a user interface of the cleaning module is described in greater detail in relation to FIGS. 5 and 6.

In certain embodiments, the pre-defined action is one of: (a) automatically cleaning at least one of one or more files or a registry of the computer, and notifying a user of the computer of the automatic cleaning; (b) automatically cleaning at least one of one or more files or a registry of the computer; or (c) prompting the user of the computer to clean at least one of one or more files or a registry of the computer, and cleaning at least one of one or more files or a registry of the computer in response to receiving an instruction to clean from the user of the computer. The flow then proceeds to step 420.

At step 420, the cleaning module defines a threshold for a size of file storage space saved by cleaning one or more files. As one of ordinary skill in the art would readily appreciate, this is an example of criteria that can be defined involving one or more characteristics of the computer, according to the embodiment. As one of ordinary skill in the art would also readily appreciate, in alternate embodiments, additional or alternate criteria involving one or more characteristics of the computer can be defined. Examples of additional or alternate criteria can include: a threshold for a number of uniform resource locators associated with an application; a threshold for a number of settings associated with an application; a threshold for a size of an individual file saved by cleaning the individual file; a threshold for a size of a trash area associated with an email account; a threshold for a number of registry values of a registry; or a threshold for a number of files. In certain embodiments, the pre-defined criteria can be defined by a user of the cleaning module, where the user defines pre-defined criteria using a user interface of the cleaning module. As previously described, an example of a user interface of the cleaning module is described in greater detail in relation to FIGS. 5 and 6. The flow then proceeds to step 430.

At step 430, the cleaning module defines a time duration between periodic monitoring. The time duration can represent a time duration between periodic instances of monitoring the computer. In certain embodiments, the time duration can be defined by a user of the cleaning module, where the user enters a time duration value within a user interface of the cleaning module, where the time duration value represents the time duration between periodic instances of monitoring the computer. In embodiments where the computer is only monitored once, step 430 can be omitted. The flow then proceeds to step 435.

At step 435, the cleaning module determines whether the time duration between periodic monitoring has elapsed. If the time duration between periodic monitoring has not elapsed, the flow repeats back to step 435. If the time duration between periodic monitoring has elapsed, the flow then proceeds to step 440. In embodiments where the computer is only monitored once, step 435 can be omitted.

At step 440, the cleaning module monitors one or more characteristics of the computer. In certain embodiments, by monitoring one or more characteristics of the computer, the cleaning module can analyze the one or more characteristics of the computer. Further, by analyzing the one or more characteristics, the cleaning module can identify both: (a) the one or more characteristics currently present on the computer; and (b) the one or more characteristics present if the cleaning module cleaned one or more files and/or a registry of the computer. For example, if a characteristic of the computer is a size of file storage space for one or more files, by analyzing the size of file storage space for one or more files, the cleaning module can identify: (a) the size of file storage space for one or more files currently on the computer; and (b) the size of file storage space for one or more files if the cleaning module cleaned the one or more files. Thus, the cleaning module can identify a size of file storage space saved by cleaning one or more files. One of ordinary skill in the art would readily appreciate that a size of file storage space for one or more files is an example characteristic of a computer, and that, in alternate embodiments, the one or more characteristics of the computer can include additional or alternate characteristics. Example characteristics of a computer can include: a number of uniform resource locators associated with an application; a number of settings associated with an application; a size of an individual file; a size of a trash area associated with an email account; a number of registry values of a registry; or a number of files. The cleaning of the one or more files and/or registry is further described below in greater detail. The flow then proceeds to step 445.

At step 445, the cleaning module detects that the size of file storage space saved by cleaning one or more files exceeds the pre-defined threshold. As one of ordinary skill in the art would readily appreciate, this is an example of an occurrence of pre-defined criteria involving one or more characteristics of the computer that can be detected by the cleaning module, according to the embodiment. As one of ordinary skill in the art would also readily appreciate, in alternate embodiments, the pre-defined criteria can include additional or alternate criteria involving one or more characteristics of the computer. Examples of additional or alternate criteria can include: a size of file storage space saved by cleaning one or more files exceeding a pre-defined threshold; a number of uniform resource locators associated with an application exceeding a pre-defined threshold; a number of settings associated with an application exceeding a pre-defined threshold; a size of an individual file saved by cleaning the individual file exceeding a pre-defined threshold; a size of a trash area associated with an email account exceeding a pre-defined threshold; a number of registry values of a registry exceeding a pre-defined threshold; or a number of files exceeding a pre-defined threshold. The flow then proceeds to step 450.

At step 450, the cleaning module determines whether the pre-defined action is: (a) automatically cleaning at least one of one or more files or a registry of the computer, and notifying a user of the computer of the automatic cleaning; (b) automatically cleaning at least one of one or more files or a registry of the computer; or (c) prompting the user of the computer to clean at least one of one or more files or a registry of the computer, and cleaning at least one of one or more files or a registry of the computer in response to receiving an instruction to clean from the user of the computer. If the pre-defined action is (a), the flow proceeds to step 460. If the pre-defined action is (b), the flow proceeds to step 470. If the pre-defined action is (c), the flow proceeds to step 480.

At step 460, the cleaning module automatically cleans one or more files and/or a registry of the computer. The cleaning of the one or more files and/or registry is further described below in greater detail. The flow then proceeds to step 461. At step 461, the cleaning module notifies a user of the cleaning module of the automatic cleaning. In certain embodiments, the cleaning module notifies the user by displaying a notification within a user interface of the cleaning module. The flow then ends.

At step 470, the cleaning module automatically cleans one or more files and/or a registry of the computer. As previously described, the cleaning of the one or more files and/or registry is further described below in greater detail. In contrast to step 460, the cleaning module does not notify the user of the automatic cleaning. The flow then ends.

At step 480, the cleaning module prompts a user to clean one or more files and/or a registry of the computer. In certain embodiments, the cleaning module prompts the user by displaying a window within a user interface of the cleaning module. In these embodiments, the window prompts the user of the computer to clean one or more files and/or a registry of the computer. The flow then proceeds to step 481. At step 481, upon receiving an instruction to clean the one or more files and/or the registry of the computer, the cleaning module cleans one or more files and/or a registry of the computer. In certain embodiments, the cleaning module receives the instruction, when the user "clicks" within the windows displayed within the user interface. As previously described, the cleaning of the one or more files and/or registry of the computer is further described below in greater detail. The flow then ends.

Figure 5:
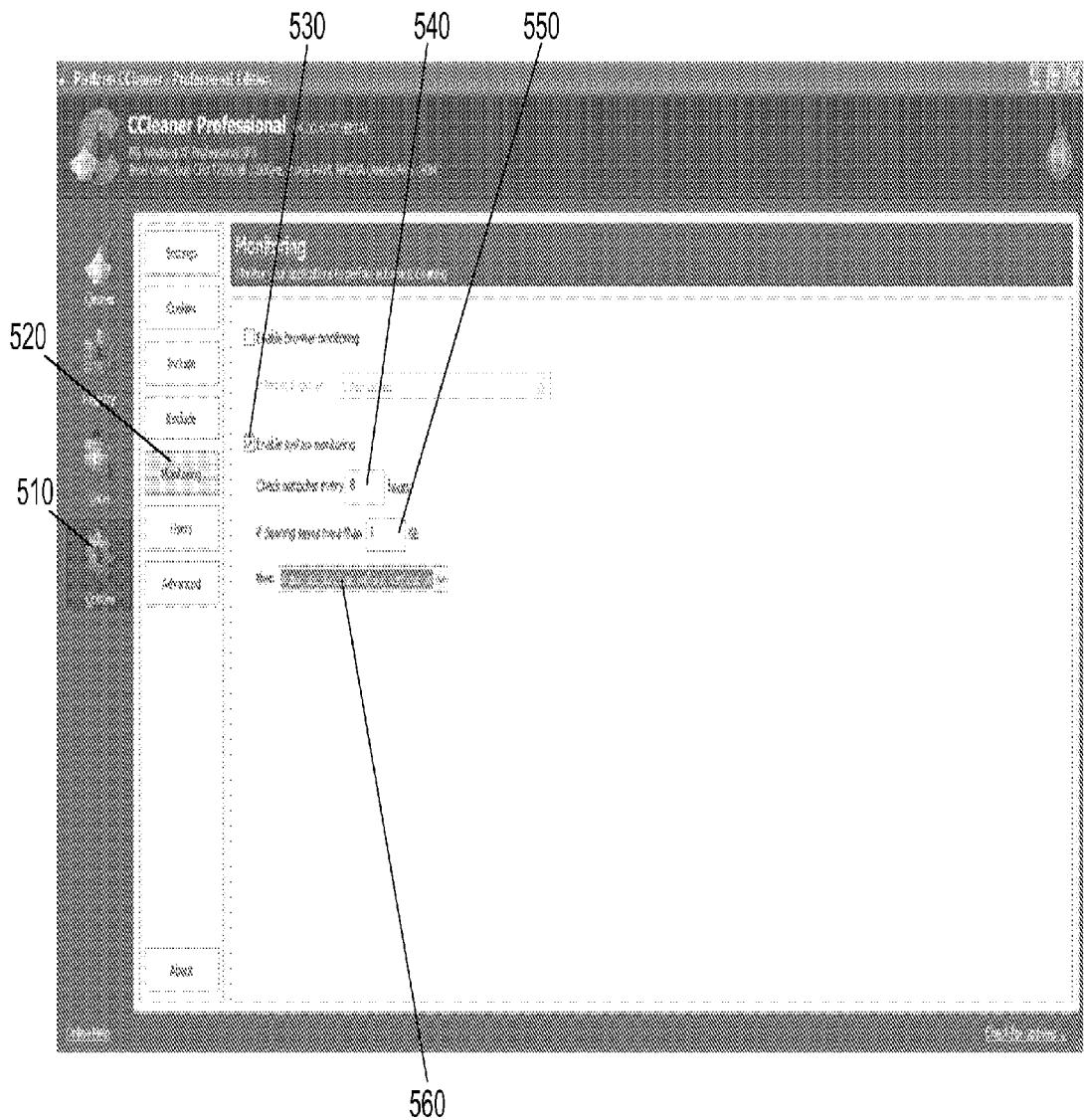
FIG. 5 illustrates a user interface of a cleaning module, according to an embodiment of the invention.

FIG. 5 illustrates a user interface that can be created by a cleaning module, executed on a computer, where the user interface is displayed to a user at a screen of the computer. However, as one of ordinary skill in the art would readily appreciate, the user interface illustrated in FIG. 5 is merely an example user interface according to an embodiment of the invention. In alternate embodiments, the cleaning module may display a user interface that has a different appearance from the user interface illustrated in FIG. 5. In one embodiment, the user interface can be a separate web service that can be executed by the cleaning module, where the cleaning module is executed on the computer. In another embodiment, the user interface can be a separate application programming interface (API) that can be executed by the cleaning module, where the cleaning module is executed on the computer. Furthermore, in alternate embodiments, the cleaning module may not display a user interface to a user. In some of these embodiments, a user interfaces with the cleaning module using a web interface. A web interface allows a user to interface with the cleaning module over a network connection, such as the Internet. The user can connect with the cleaning module, for example, over HTTP. The web interface can be located at the same computer of the cleaning module, or a separate computer, depending on the embodiment. In other alternate embodiments, there is no user interface associated with the cleaning module, whatsoever.

FIG. 5 illustrates a user interface of a cleaning module, according to an embodiment of the invention. According to the embodiment, the user interface displayed in FIG. 5 is an example user interface that can be displayed before the cleaning module monitors one or more characteristics of a computer (such as a size of file storage space saved by cleaning one or more files), and performs a pre-defined action in response to a detection of an occurrence of pre-defined criteria involving the one or more characteristics, where the pre-defined action can include cleaning one or more files and/or a registry of the computer, and where the pre-defined criteria can include the size of the file storage space saved by cleaning one or more files exceeding a pre-defined threshold.

According to the embodiment, the user interface can display an options tab 510. In the illustrated embodiment, in response to a user "clicking" options tab 510, the user interface can display one or more options for configuring the cleaning module, such as configuring the cleaning module to monitor one or more characteristics of the computer (such as a size of file storage space saved by cleaning one or more files), and perform a pre-defined action in response to a detection of an occurrence of pre-defined criteria, where the pre-defined action can include cleaning one or more files and/or a registry of the computer, and where the pre-defined criteria can include the size of the file storage space saved by cleaning one or more files exceeding a pre-defined threshold. More specifically, in response to a user "clicking" options tab 510, the user interface can display a plurality of configuration tabs.

According to the illustrated embodiment, the plurality of configuration tabs can include monitoring tab 520. In response to a user "clicking" monitoring tab 520, the user interface can display one or more options for defining a pre-defined action for the computer. More specifically, the user interface can display computer monitoring indication 530, computer monitoring frequency indication 540, computer monitoring criteria indication 550 and action indication 560. Computer monitoring indication 530 displays an indication of whether monitoring of the computer is enabled. By "clicking" on computer application monitoring indication 530, a user can either enable or disable monitoring of the computer. Computer monitoring period indication 540 displays an indication of a time duration value that represents a time duration between periodic instances of monitoring the computer. A user can enter a time duration value within computer monitoring period indication 540, and can customize a periodic monitoring of the computer (i.e., can customize the time duration between periodic instances of monitoring the computer). In the illustrated embodiment, a user can enter a time duration value which defines a number of hours that elapse between periodic instances of monitoring the computer. However, this is merely an example time duration according to the embodiment, and, in alternate embodiments, any time duration can be defined by the user (such as any number of seconds, minutes, hours, days, weeks, months, years, etc.). Criteria indication 550 displays criteria, where the occurrence of the criteria triggers a pre-defined action. A user can define the criteria, and thus, customize the criteria used to trigger a pre-defined action. In the illustrated embodiment, the user can enter a size value that defines a threshold associated with a size of the file storage space saved by cleaning one or more files. The pre-defined threshold can then be used as pre-defined criteria to trigger a pre-defined action. However, this is merely an example of pre-defined criteria, and in alternate embodiments, any criteria can be defined, such as example criteria previously described. Action indication 560 displays a selection window that includes a list of one or more pre-defined actions that can be defined for the computer. As described below in greater detail in relation to FIG. 6, by "clicking" on action indication 560, a user can select a pre-defined action from the list of one or more pre-defined actions displayed within the selection window, and can define the selected pre-defined action for the computer.

Figure 6:
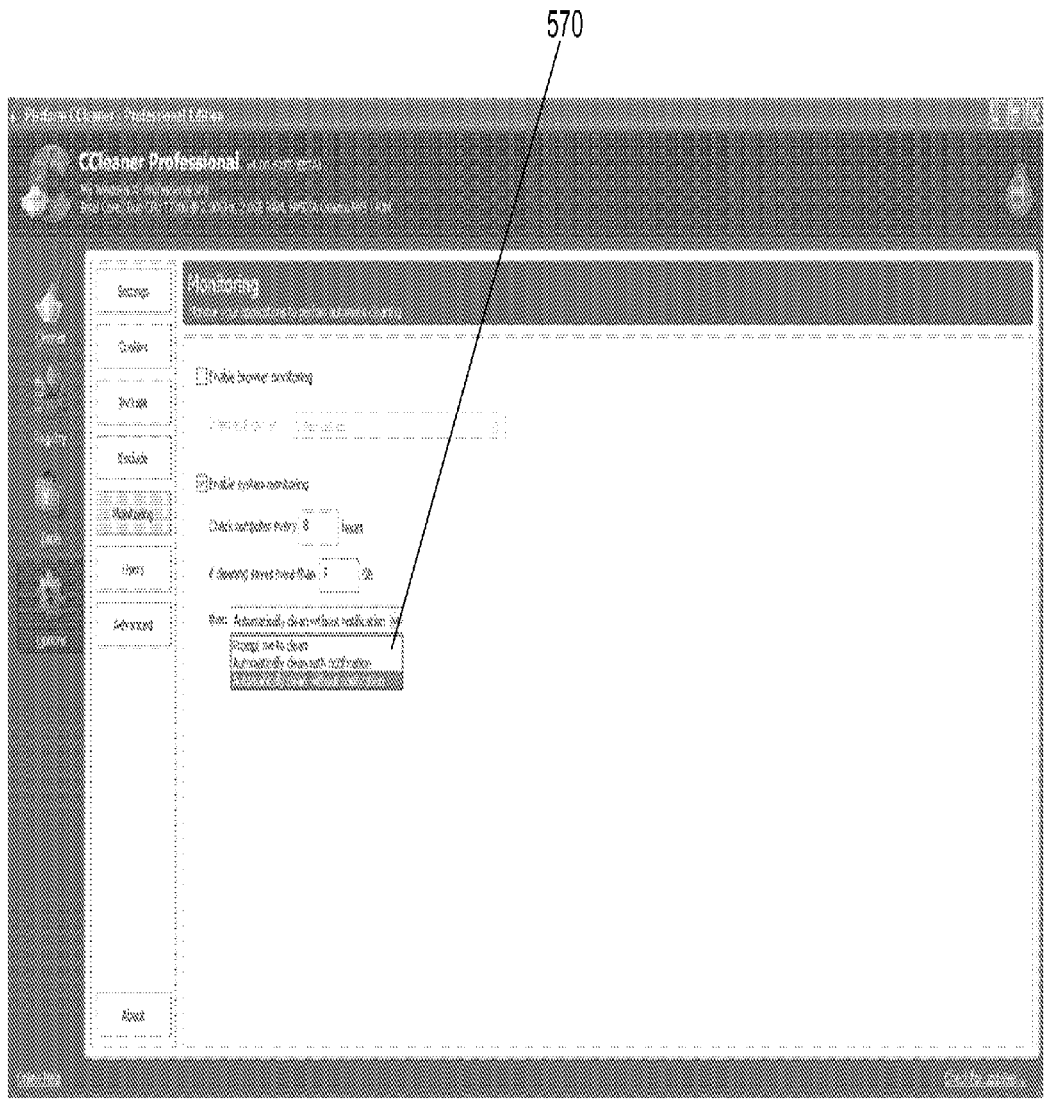
FIG. 6 illustrates a selection window displayed within a user interface of a cleaning module, according to an embodiment of the invention.

FIG. 6 illustrates a selection window 570 displayed within a user interface of a cleaning module, according to an embodiment of the invention. Selection window 570 displays one or more pre-defined actions that can be defined for a computer. As previously described, a user can select a pre-defined action from the list of one or more pre-defined actions displayed within the selection window, and can define the selected pre-defined action for the computer. In the illustrated embodiment of FIG. 6, selection window displays the following pre-defined actions: (a) automatically cleaning at least one of one or more files or a registry of the computer, and notifying a user of the computer of the automatic cleaning (illustrated in FIG. 6 as "Automatically clean with notification"); (b) automatically cleaning at least one of one or more files of the computer (illustrated in FIG. 6 as "Automatically clean without notification"); or (c) prompting the user of the computer to clean at least one of one or more files or a registry of the computer, and cleaning at least one of one or more files or a registry of the computer in response to receiving an instruction to clean from the user of the computer (illustrated in FIG. 6 as "Prompt me to clean"). However, this is only an example embodiment, and in alternate embodiments, selection window 570 can display any pre-defined actions that can be defined for the computer.

Specifics of the file cleaning and registry cleaning performed by a cleaning module that is executed on a computer are now described in greater detail, in accordance with one embodiment. According to the embodiment, the cleaning module can determine application information from the computer. In one embodiment, the application information includes an application list that represents one or more applications that are installed on the computer. In one embodiment, the cleaning module generates the application list by determining whether one or more applications are installed on the computer. According to the embodiment, the cleaning module can include a list of applications that are commonly installed on a computer within the application list, such as Microsoft® Internet Explorer®, Mozilla® Firefox®, Apple® Safari®, Google® Chrome®, and Opera®. The cleaning module can also include, within the application list, a list of locations on the computer that the cleaning module can analyze to determine whether such an application is installed. In one embodiment, the list of locations includes a list of file locations. In another embodiment, the list of locations includes a list of registry entries. In yet another embodiment, the list of locations includes a combination of both a list of file locations and a list of registry entries. According to the embodiment, if the cleaning module determines that an application is installed, the cleaning module can include that application in the application list. If the cleaning module determines that the application is not installed, the cleaning module can exclude that application from the application list.

Further, according to an embodiment, the cleaning module can select which applications from the application list are to be cleaned, and which applications from the application list are not to be cleaned. Furthermore, regarding the applications that are to be cleaned, the cleaning module can configure which items corresponding to the application are to be removed, where the items can include files, registry entries, data from files, data from registry entries, or a combination therein.

Subsequently, the cleaning module can determine a cleaning rule set, where the determining of the cleaning rule set can be based on the application information. In on embodiment, the cleaning rule set includes one or more cleaning rule identities, where a cleaning rule identity is an identity that uniquely identifies a cleaning rule. A cleaning rule includes one or more parameters for cleaning one or more files and/or a registry of the computer. The parameters of the cleaning rule instruct cleaning module on what items to remove when applying the cleaning rule, where the items can include files, registry entries, data from files, data from registry entries, or a combination therein. A cleaning rule can be stored within a cleaning module.

According to the embodiment, the cleaning module can generate an instruction to clean one or more files and/or a registry of the computer, where the instruction can be based on the cleaning rule set. According to the embodiment, the instruction instructs the cleaning module, for each cleaning rule identity of the cleaning vile set, to apply a cleaning rule that corresponds to the cleaning vile identity. By instructing the cleaning module to apply a cleaning rule, the instruction instructs the cleaning module to perform at least one of the following: removing one or more files; removing data from one or more files; removing one or more registry entries; or removing data from one or more registry entries. Thus, the instruction can instruct the cleaning module to perform file cleaning, registry cleaning, or a combination of the two.

In an alternate embodiment, the cleaning module can generate an instruction to analyze, rather than clean, one or more files and/or a registry, where the instruction can be based on the cleaning rule set. In the alternate embodiment, the instruction instructs the cleaning module, for each cleaning rule identity of the cleaning rule set, to apply a cleaning rule that corresponds to the cleaning rule identity. By instructing the cleaning module to apply a cleaning rule, the instruction instructs the cleaning module to perform at least one of the following: identifying one or more files to be removed; identifying data from one or more files to be removed; identifying one or more registry entries to be removed; or identifying data from one or more registry entries to be removed.

According to an embodiment, a cleaning rule can be one of three types of cleaning rules: a system cleaning rule that can be applied to clean at least one of one or more files and one or more registry entries; an application cleaning rule that can be applied to clean at least one of one or more files and one or more registry entries; or a registry cleaning rule that can be applied to clean one or more registry entities.

A system cleaning rule is a cleaning rule for the cleaning of at least one of one or more files, and one or more registry entries, corresponding to a system component of a computer, rather than a specific application. According to one embodiment, examples of system components include the following components: Recycle Bin, Temporary Files, Clipboard, Memory Dumps, Chkdsk File Fragments, Windows Log Files, Windows Error Reporting, DNS Cache, FTP Accounts, Start Menu Shortcuts, and Desktop Shortcuts. One of ordinary skill in the art would readily appreciate that these components are merely example components, and a system cleaning rule can clean other system components of a computer.

According to an embodiment, the following is an example system cleaning rule for cleaning the Windows Log Files component:

---
[Windows Log Files]
---
ID=1017
LangSecRef=3003
LangRef=3145
Default=True
FileKey1=%SystemDirectory%\wbem\Logs|*.log
FileKey2=%SystemDirectory%\wbem\Logs|*.lo_
FileKey3=%windir%|*.log
FileKey4=%windir%|*.bak
FileKey5=%windir%|*log.txt
FileKey6=%commonappdata%\Microsoft\Dr Watson|*.log
FileKey7=%commonappdata%\Microsoft\Dr Watson|*.dmp
FileKey8=%windir%\Debug|*.log
FileKey9=%windir%\Debug\UserMode|*.log
FileKey10=%windir%\Debug\UserMode|*.bak
FileKey11=%windir%|ScheduLgU.txt -continued
---
[Windows Log Files]
---
FileKey12=%windir%\security\logs|*.log
FileKey13=%windir%\security\logs|*.old According to the embodiment, the system cleaning rule includes an ID parameter, whose value represents a cleaning rule identity. The system cleaning rule also includes a LangSecRef parameter and a LangRef parameter, whose values represent a system component or application to be cleaned. In addition, the system cleaning rule includes a Default parameter, whose value indicates whether the cleaning rule is applied as a default. The system cleaning rule also includes the following parameters: FileKey1, FileKey2, FileKey3, FileKey4, FileKey5, FileKey6, FileKey7, FileKey8, FileKey9, FileKey10, FileKey11, FileKey12, and FileKey13. Each of these parameters is an example of a FileKey parameter. A FileKey parameter indicates specific files that are cleaned when the cleaning rule is applied.

In an alternate embodiment, a system cleaning rule can include a DetectFile parameter, a Detect parameter, or a combination of the two. The DetectFile parameter can be used to detect the presence of a system component or application by looking for specific files. The Detect parameter can be used to detect the presence of a system component or application by looking for specific registry entries. In the alternate embodiment, a system cleaning rule can also include any number of RegKey parameters. A RegKey parameter indicates specific registry entries that are cleaned when the cleaning rule is applied.

One of ordinary skill in the art would readily appreciate that the system cleaning rule shown above is only an example, and that a system cleaning rule may take different forms and still be within the scope of the invention.

An application cleaning rule is a cleaning rule for the cleaning of at least one of one or more files, and one or more registry entries, corresponding to a specific application of a computer. According to one embodiment, examples of applications include the following applications: Mozilla® Firefox®, Opera®, Apple® Safari®, Google® Chrome®, Adobe® Acrobat Reader®, Adobe® ImageReady®, Adobe® Photoshop®, Adobe® Illustrator®, Yahoo® Toolbar, Windows Live® Toolbar, Google® Toolbar, Google® Deskbar®, Google® Calendar Sync®, Google® Talk®, Microsoft® Windows Media Player®, Real® Player, Quicklime® Player, Adobe® Paint Shop Pro®, Microsoft® Works®, Microsoft® Office®, Installshield® Developer®, Macromedia® Flash®, Adobe® Flash Player®, Macromedia® Homesite®, Macromedia® Fireworks®, Macromedia® Dreamweaver®, Macromedia® Shockwave®, and Microsoft® Silverlight®. One of ordinary skill in the art would readily appreciate that these applications are merely example components, and an application cleaning rule can clean other applications of a computer.

According to an embodiment, the following is an example application cleaning rule for cleaning an Internet cache of Mozilla® Firefox®:

---
[Mozilla - Internet Cache]
---
ID=2001
LangSecRef=3026
Default=True
SpecialDetect=DET_MOZILLA
SpecialKey1=N_MOZ_CACHE According to the embodiment, the application cleaning rule includes an ID parameter, whose value represents a cleaning rule identity. The application cleaning rule also includes a LangSecRef parameter, whose values represent a system component to be cleaned. In addition, the application cleaning rule includes a Default parameter, whose value indicates whether the application cleaning rule is applied as a default. The application cleaning rule also includes the following parameters: SpecialDetect and SpecialKey1. The values for the parameters SpecialDetect and SpecialKey1 represent dedicated functions that are used to detect applications or system components and clean them.

In an alternate embodiment, an application cleaning rule can include a DetectFile parameter, a Detect parameter, or a combination of the two, which have previously been described. In the alternate embodiment, an application cleaning rule can also include any number of FileKey parameters and/or RegKey parameters, both of which have also previously been described.

One of ordinary skill in the art would readily appreciate that the application cleaning rule shown above is only an example, and that an application cleaning rule may take different forms and still be within the scope of the invention.

A registry cleaning rule is a cleaning rule for the cleaning one or more registry entries of a computer. According to one embodiment, examples of registry cleaning rules include the following examples:

Missing Shared Dynamically Linked Libraries (DLLs)—Removes entry for a library which is shared by multiple programs that no longer exist;

Unused File Extensions—Removes entries for file extensions that are no longer associated with installed applications;

ActiveX and Class Issues—Removes invalid entries from COM/ActiveX object that refer to a non-existing file;

Type Libraries—Removes invalid entries for type library that refer to an non-existing file;

Applications—Removes invalid entries for non-existent programs;

Fonts—Removes invalid entries for fonts that no longer exist in a Windows Fonts folder;

Application Paths—Removes entries for registered application path that no longer exists;

Help Files—Removes entries referring to Help files that no longer exist;

Installer—Removes unnecessary uninstallers or the remnants of previous uninstallations;

Obsolete Software—Removes entries for applications that are no longer installed;

Run At Startup—Removes entries for Startup applications that no longer exist;

Start Menu Ordering—Removes entries for Start menu application that no longer exist; and MUI Cache—Removes invalid entries from a chance of recently run programs.

One of ordinary skill in the art would readily appreciate that these are merely example registry cleaning rules, and that other registry cleaning rules can be included.

According to an embodiment, the following is an example registry cleaning rule for cleaning missing shared DLLs:

---

[Missing Shared DLLs]

LangSecRef=3501
LangRef=3601
Default=True
SpecialKey1=R_SHARED_DLLS

---

According to the embodiment, the registry cleaning rule includes an ID parameter, whose value represents a cleaning rule identity. The registry cleaning rule also includes a LangSecRef parameter and a LangRef parameter, whose values represent one or more registry entries to be cleaned. In addition, the registry cleaning rule includes a Default parameter, whose value indicates whether the registry cleaning rule is applied as a default. The application cleaning rule also includes a SpecialKey1 parameter, whose value represents a dedicated function that is used to detect registry entries and clean them.

In an alternate embodiment, a registry cleaning rule can include a Detect parameter, which has previously been described. In the alternate embodiment, an application cleaning rule can also include any number of RegKey parameters, which also have previously been described.

One of ordinary skill in the art would readily appreciate that the registry cleaning rule shown above is only an example, and that a registry cleaning rule may take different forms and still be within the scope of the invention.

According to an alternate embodiment, a cleaning module can also generate an instruction to clean one or more databases of a computer, where the instruction is based on the cleaning rule set. According to the alternate embodiment, the instruction instructs the cleaning module, for each appropriate cleaning rule identity of the cleaning rule set, to apply a cleaning rule that corresponds to the cleaning rule identity, to perform database cleaning, database optimization, database compacting, or a combination therein, on the one or more databases. As understood by one of ordinary skill in the art, database cleaning refers to removing one or more database records from one or more database tables. The one or more database records can be removed because of various technical or business reasons. For example, the data in the one or more database records may be incomplete or corrupt. As another example, the one or more database records may not be utilized. Database optimization refers to improving speed and functionality of querying the one or more databases, such as creating or modifying one or more indexes. Database compacting refers to compacting data stored in the one or more databases, so that the one or more databases require a smaller amount of storage space on the computer. According to the alternate embodiment, the cleaning module can clean one or more databases of the computer based on the generated instruction and the cleaning rule set.

According to another alternate embodiment, a cleaning module can also generate an instruction to optimize one or more browser applications of a computer, where the instruction is based on the cleaning rule set. A browser application, as previously described, is an application configured to retrieve, present, and traverse information resources over the Internet, such as the World Wide Web. Examples of a browser application include Microsoft® Internet Explorer®, Mozilla® Firefox®, Apple® Safari®, Opera®, and Google® Chrome®. Optimizing a browser application can include cleaning one or more files associated with the browser application, cleaning one or more registry entries associated with the browser application, cleaning one or more databases associated with the browser application, or a combination therein, as previously described. According to the alternate embodiment, a cleaning module can optimize one or more browser applications of a computer based on the generated instruction and the cleaning rule set.

According to an embodiment, a cleaning module can monitor one or more characteristics of a computer, detect an occurrence of pre-defined criteria involving the one or more characteristics of the computer, and perform a pre-defined action in response to the pre-defined criteria. The pre-defined criteria can include: a size of file storage space saved by cleaning one or more files exceeding a pre-defined threshold; a number of uniform resource locators associated with an application exceeding a pre-defined threshold; a number of settings associated with an application exceeding a pre-defined threshold; a size of an individual file saved by cleaning the individual file exceeding a pre-defined threshold; a size of a trash area associated with an email account exceeding a pre-defined threshold; a number of registry values of a registry exceeding a pre-defined threshold; and/or a number of files exceeding a pre-defined threshold. The pre-defined action can include: automatically cleaning one or more files and/or a registry of the computer with a notification; automatically cleaning one or more files and/or a registry of the computer without a notification; or prompting a user to clean one or more files and/or a registry of the computer, and cleaning the one or more files and/or the registry of the computer in response to receiving an instruction to clean from the user; or ignoring the closing of the browser application. By providing the user the ability to monitor one or more characteristics of the computer, and to customize an action that can be performed upon pre-defined criteria involving the one or more characteristics, the cleaning module can provide a more active cleaning process. Such an active cleaning process can preserve storage space for the computer system, and can make the computer system operate faster and be more stable.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method for increasing the processing speed of a computer, comprising:
monitoring, by a cleaning module executed by a processor of a computer, characteristics of the computer including at least one of:
a size of file storage space saved by cleaning one or more files stored in a memory, and
a number of registry entries stored in a registry of the computer;
detecting, by the cleaning module, an occurrence of pre-defined criteria including at least one of:
whether the size of file storage space saved by cleaning the one or more files stored in the memory exceeds a first pre-defined threshold, and
whether the number of registry entries exceeds a second pre-defined threshold; and
performing, based on said detecting by the cleaning module, pre-defined actions on the computer including at least one of:
cleaning the one or more files including deleting at least one file from the memory, or removing data from at least one file stored in the memory, and
cleaning the registry including deleting at least one registry entry from the registry, or removing data from at least one registry entry stored in the registry.

2. The method of claim 1, further comprising:
prompting, by the cleaning module, a user of the computer to clean the one or more files or the registry of the computer based on said detecting, and
cleaning, by the cleaning module, the one or more files or the registry of the computer in response to receiving an instruction to clean from the user of the computer.

3. The method of claim 2, wherein prompting the user of the computer includes displaying, by the cleaning module, a window within a user interface of the cleaning module that prompts the user of the computer to clean the one or more files or the registry of the computer.

4. The method of claim 1,
wherein the characteristics of the computer further comprise:
a number of uniform resource locators associated with an application;
a number of settings associated with the application;
a size of a trash area associated with an email account; and
a number of files;
wherein the pre-defined criteria further comprise:
whether the number of uniform resource locators associated with the application exceeds a third pre-defined threshold;
whether the number of settings associated with the application exceeds a fourth pre-defined threshold;
whether the size of the trash area associated with the email account exceeds a fifth pre-defined threshold; and
whether the number of files exceeds a sixth pre-defined threshold; and
wherein of pre-defined actions further comprise;
cleaning the number of uniform resource locators associated with the application;
cleaning the number of settings associated with the application;
cleaning the trash area associated with the email account; and
cleaning the number of files.

5. The method of claim 1, wherein monitoring the characteristics of the computer further comprise periodically monitoring, by the cleaning module, the characteristics based on a time duration value that defines a time duration between periodic instances of monitoring the computer.

6. The method of claim 1, wherein the pre-defined criteria and the pre-defined actions are based on an instruction and a cleaning rule set.

7. The method of claim 6,
wherein the cleaning module comprises one or more cleaning rules;
wherein the cleaning rule set comprises one or more cleaning rule identities;
wherein each cleaning rule identity of the one or more cleaning rule identities corresponds to a unique cleaning rule; and
wherein a cleaning rule comprises a set of one or more parameters for cleaning at least one of the one or more files or the registry of the computer.

8. The method of claim 7, wherein each cleaning rule identity of the one or more cleaning rule identities corresponds to either a system cleaning rule, an application cleaning rule, or a registry cleaning rule.

9. The method of claim 6, further comprising:
cleaning, by the cleaning module, one or more databases of the computer, based on an instruction to clean one or more databases and a cleaning rule set; or optimizing, by the cleaning module, one or more browser applications of the computer, based on an instruction to optimize one or more browser applications and a cleaning rule set.

10. A non-transitory computer-readable medium having a computer program stored thereon that, when executed by a processor, causes the processor to implement a method for increasing the processing speed of a computer, said increasing the processing speed comprising:
monitoring, by a cleaning module executed by a processor of a computer, characteristics of the computer including at least one of:
a size of file storage space saved by cleaning one or more files stored in a memory, and
a number of registry entries stored in a registry of the computer;
detecting, by the cleaning module, an occurrence of pre-defined criteria including at least one of:
whether the size of file storage space saved by cleaning the one or more files stored in the memory exceeds a first pre-defined threshold, and
whether the number of registry entries exceeds a second pre-defined threshold; and
performing, based on said detecting by the cleaning module, pre-defined actions on the computer including at least one of:
cleaning the one or more files including deleting at least one file from the memory, or removing data from at least one file stored in the memory, and
cleaning the registry including deleting at least one registry entry from the registry, or removing data from at least one registry entry stored in the registry.

11. The non-transitory computer-readable medium of claim 10, wherein said increasing the processing speed further comprises:
prompting, by the cleaning module, a user of the computer to clean the one or more files or the registry of the computer based on said detecting, and
cleaning, by the cleaning module, the one or more files or the registry of the computer in response to receiving an instruction to clean from the user of the computer.

12. The non-transitory computer-readable medium of claim 11, wherein prompting the user of the computer includes displaying, by the cleaning module, a window within a user interface of the cleaning module that prompts the user of the computer to clean the one or more files or the registry of the computer.

13. The non-transitory computer-readable medium of claim 10,
wherein the characteristics of the computer further comprise:
a number of uniform resource locators associated with an application;
a number of settings associated with the application;
a size of a trash area associated with an email account; and
a number of files;
wherein the pre-defined criteria further comprise:
whether the number of uniform resource locators associated with the application exceeds a third pre-defined threshold;
whether the number of settings associated with the application exceeds a fourth pre-defined threshold;
whether the size of the trash area associated with the email account exceeds a fifth pre-defined threshold; and
whether the number of files exceeds a sixth pre-defined threshold; and
wherein the pre-defined actions further comprise:
cleaning the number of uniform resource locators associated with the application;
cleaning the number of settings associated with the application;
cleaning the trash area associated with the email account; and
cleaning the number of files.

14. The non-transitory computer-readable medium of claim 10, wherein monitoring the characteristics of the computer further comprise periodically monitoring, by the cleaning module, the characteristics based on a time duration value that defines a time duration between periodic instances of monitoring the computer.

15. The non-transitory computer-readable medium of claim 10, wherein the pre-defined criteria and the pre-defined actions are based on an instruction and a cleaning rule set.

16. The non-transitory computer-readable medium of claim 15,
wherein the cleaning module comprises one or more cleaning rules;
wherein the cleaning rule set comprises one or more cleaning rule identities;
wherein each cleaning rule identity of the one or more cleaning rule identities corresponds to a unique cleaning rule; and
wherein a cleaning rule comprises a set of one or more parameters for cleaning at least one of the one or more files or the registry of the computer.

17. The non-transitory computer-readable medium of claim 16, wherein each cleaning rule identity of the one or more cleaning rule identities corresponds to either a system cleaning rule, an application cleaning rule, or a registry cleaning rule.

18. The non-transitory computer-readable medium of claim 15, wherein said increasing the processing speed further comprises:
cleaning, by the cleaning module, one or more databases of the computer based on an instruction to clean one or more databases and a cleaning rule set; or
optimizing, by the cleaning module, one or more browser applications of the computer, based on an instruction to optimize one or more browser applications and a cleaning rule set.

19. An apparatus, comprising:
a memory storing a cleaning module for increasing the processing speed of the apparatus; and
a processor configured to execute the cleaning module stored in the memory, the processor being further configured, when executing the cleaning module stored in the memory, to:
monitor characteristics including at least one of:
a size of file storage space saved by cleaning one or more files stored in a memory, and
a number of registry entries stored in a registry;
detect an occurrence of pre-defined criteria including at least one of:
whether the size of file storage space saved by cleaning the one or more files stored in the memory exceeds a first pre-defined threshold, and
whether the number of registry entries exceeds a second pre-defined threshold; and
perform, based on said detecting, pre-defined actions including at least one of:

cleaning the one or more files including deleting at least one file, or removing data from at least one file, and cleaning the registry including deleting at least one registry entry from the registry, or removing data from at least one registry entry stored in the registry.

20. The apparatus of claim 19, wherein the processor is further configured to:

prompt a user to clean the one or more files or the registry based on said detecting, and clean the one or more files or the registry in response to receiving an instruction to clean from the user.

21. The apparatus of claim 20, wherein to prompt the user includes to display, by the cleaning module, a window within a user interface of the cleaning module that prompts the user to clean the one or more files or the registry.

22. The apparatus of claim 19, wherein the characteristics further comprise:
a number of uniform resource locators associated with an application;
a number of settings associated with the application;
a size of a trash area associated with an email account; and
a number of files;

wherein the pre-defined criteria further comprise:
whether the number of uniform resource locators associated with the application exceeds a third pre-defined threshold;
whether the number of settings associated with the application exceeds a fourth pre-defined threshold;
whether the size of the trash area associated with the email account exceeds a fifth pre-defined threshold; and
whether the number of files exceeds a sixth pre-defined threshold; and wherein the pre-defined actions further comprise:
cleaning the number of uniform resource locators associated with the application;
cleaning the number of settings associated with the application;
cleaning the trash area associated with the email account; and
cleaning the number of files.

23. The apparatus of claim 19, wherein to monitor the characteristics further comprise to periodically monitor, by the cleaning module, the characteristics based on a time duration value that defines a time duration between periodic instances of monitoring.

24. The apparatus of claim 19, wherein the pre-defined criteria and the pre-defined actions are based on an instruction and a cleaning rule set.

25. The apparatus of claim 24, wherein the cleaning module comprises one or more cleaning rules;
wherein the cleaning rule set comprises one or more cleaning rule identities;
wherein each cleaning rule identity of the one or more cleaning rule identities corresponds to a unique cleaning rule; and
wherein a cleaning rule comprises a set of one or more parameters for cleaning at least one of the one or more files or the registry.

26. The apparatus of claim 25, wherein each cleaning rule identity of the one or more cleaning rule identities corresponds to either a system cleaning rule, an application cleaning rule, or a registry cleaning rule.

27. The apparatus of claim 24, wherein the processor is further configured to:

clean one or more databases of the computer based on an instruction to clean one or more databases and a cleaning rule set; or
optimize one or more browser applications of the computer based on an instruction to optimize one or more browser applications and a cleaning rule set.

* * * * *